United States Patent [19]
Agrawal et al.

[11] Patent Number: 5,429,666
[45] Date of Patent: Jul. 4, 1995

[54] VSA ADSORPTION PROCESS WITH CONTINUOUS OPERATION

[75] Inventors: Rakesh Agrawal, Emmaus; Ravi Kumar, Allentown; Tarik Naheiri, Bath; Charles F. Watson, Orefield, all of Pa.

[73] Assignee: Air Products and Chemicals, Inc., Allentown, Pa.

[21] Appl. No.: 191,401

[22] Filed: Feb. 3, 1994

[51] Int. Cl.⁶ .......................................... B01D 53/053
[52] U.S. Cl. ...................................... 95/101; 95/102; 95/103; 95/105; 95/130
[58] Field of Search ........................... 95/101–103, 95/105, 122, 130, 139, 148

[56] References Cited

U.S. PATENT DOCUMENTS

| | | | |
|---|---|---|---|
| 3,533,221 | 10/1970 | Tamura | 95/105 |
| 3,738,087 | 6/1973 | McCombs | 95/130 X |
| 4,222,750 | 9/1980 | Gauthier et al. | 95/102 |
| 4,519,813 | 5/1985 | Hagiwara et al. | 95/101 |
| 4,578,089 | 3/1986 | Richter et al. | 95/101 |
| 4,756,723 | 7/1988 | Sircar | 95/103 |
| 4,781,735 | 11/1988 | Tagawa et al. | 55/26 |
| 4,813,977 | 3/1989 | Schmidt et al. | 95/102 |
| 4,857,083 | 8/1989 | DiMartino | 95/101 X |
| 4,917,710 | 4/1990 | Haruna et al. | 55/26 |
| 5,015,271 | 5/1991 | Reiss | 55/25 |
| 5,122,164 | 6/1992 | Hirooka et al. | 55/26 |
| 5,223,004 | 6/1993 | Eteve et al. | 55/26 |
| 5,328,503 | 7/1994 | Kumar et al. | 95/101 |
| 5,330,561 | 7/1994 | Kumar et al. | 95/101 |

FOREIGN PATENT DOCUMENTS 0354259  2/1990  European Pat. Off. .

OTHER PUBLICATIONS

Kumar, et al; Application Ser. No. 08/047,539 filed Mar. 25, 1993; CIP of Ser. No. 07/976,878 filed Nov. 16, 1992 "Extended Vacuum Swing Adsorption Process".
Kumar, et al; Application Ser. No. 08/037,070 filed Mar. 25, 1993; CIP of Ser. No. 07/976,878 filed Nov. 16, 1992 "Adsorption Process with Mixed Repressurization and Purge Equalization".

*Primary Examiner*—Robert Spitzer
*Attorney, Agent, or Firm*—Geoffrey L. Chase; William F. Marsh

[57] ABSTRACT

A process for separating a feed gas mixture into a more strongly adsorbable component and a less strongly adsorbable component in a plurality of adsorbent beds containing an adsorbent selective for the more strongly adsorbable component using pressurization by product end to product end pressure equalization between beds simultaneous with cocurrent ambient and elevated pressure feed pressurization, coproduction of product and purge gas, and cocurrent depressurization for pressure equalization gas simultaneous with countercurrent evacuation. Oxygen product can be recovered from air at high recovery using the process.

17 Claims, 1 Drawing Sheet

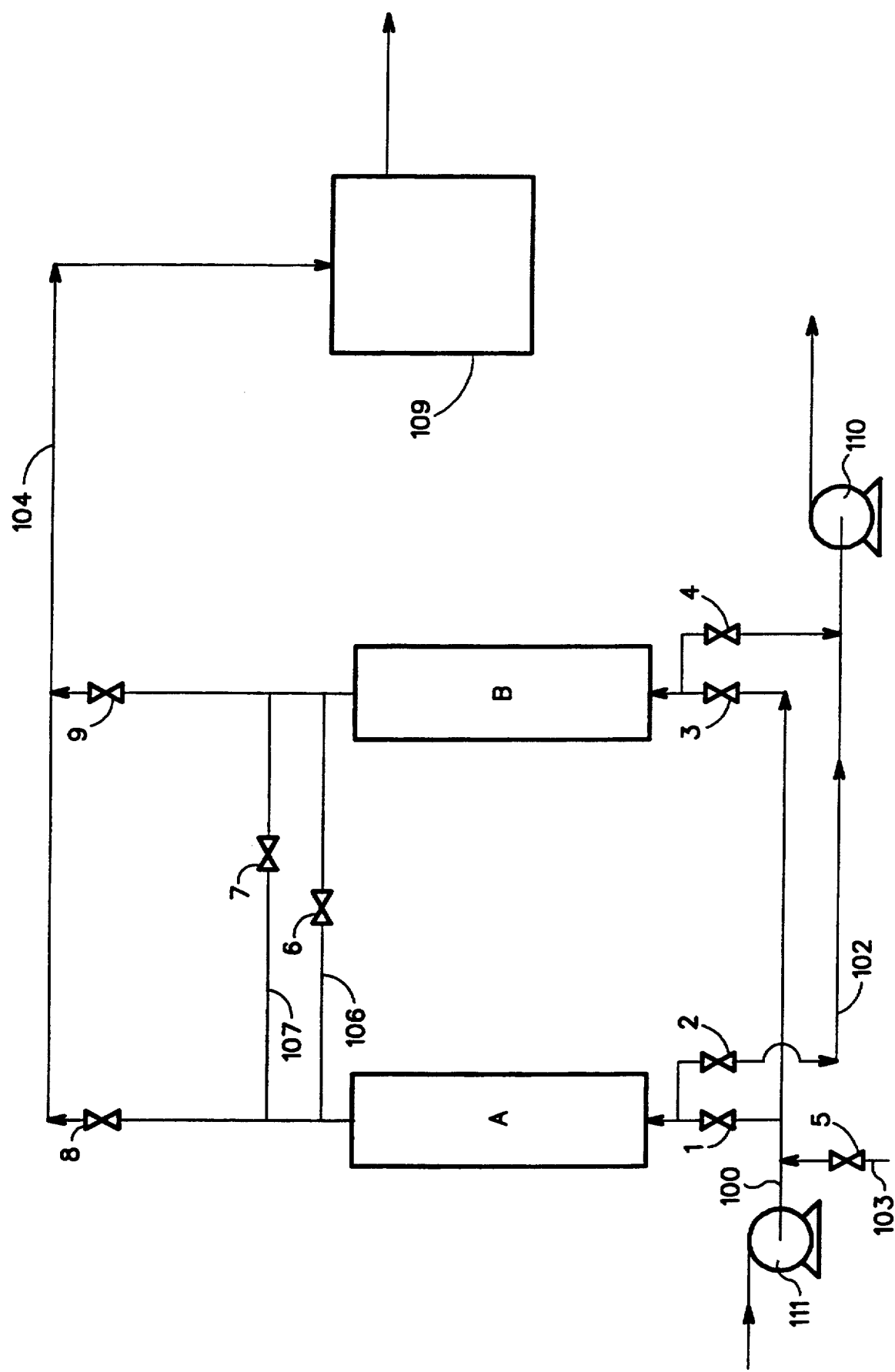

VSA ADSORPTION PROCESS WITH CONTINUOUS OPERATION

FIELD OF THE INVENTION

The present invention is directed to a pressure swing adsorption process for the separation of a more strongly adsorbable component from a less strongly adsorbable component in a gas mixture with high recovery of the less strongly adsorbable component at approximately feed pressure. More specifically, the present invention is a vacuum swing adsorption process for the separation of air to recover oxygen as a relatively unadsorbed product at high recovery and approximately feed pressure.

BACKGROUND OF THE PRIOR ART

Oxygen is a commodity chemical in the industrial gas industry. It has numerous applications including waste water treatment, glass melting furnaces, and the steel industry. One of the most common methods of oxygen production is by cryogenic distillation of air. However, this technology is not competitive for small size oxygen plants (<100 TPD $O_2$). The technology of choice for this size range is adsorption. There is a need in the marketplace to produce oxygen at low capital and energy costs by adsorptive gas separation.

Adsorptive processes are extensively used in the industry to produce oxygen from air for small size oxygen plants (<100 TPD $O_2$). There are two major categories of these processes—pressure swing adsorption processes (PSA) and vacuum swing adsorption processes (VSA). The pressure swing adsorption processes carry out the adsorption (feed) step at pressures much higher than ambient and adsorbent regeneration at pressures close to ambient. The adsorbent beds go through secondary process steps, such as pressure equalizations, depressurizations, blowdowns, and purge or various combinations of these during the cycle.

These processes tend to be energy intensive and more suitable for smaller oxygen plants producing less than 40 tons of oxygen per day and preferably less than 20 tons of oxygen per day. A subset of $O_2$ PSA processes is a rapid pressure swing adsorption (RPSA) process. As the name implies, this process involves similar steps as a PSA process, but carries out these steps very quickly. Again, this process tends to be energy intensive and suitable for oxygen plants even smaller than $O_2$ PSA's.

Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure slightly above ambient and adsorbent regeneration is carried out at sub-atmospheric levels. The adsorbent beds go through several secondary steps with the primary aim of increasing oxygen recovery and reducing adsorbent inventory per unit of product gas.

U.S. Pat. No. 4,917,710 describes a two bed $O_2$ VSA process with a product storage vessel. Process cycle steps are: adsorption, cocurrent depressurization, simultaneous cocurrent depressurization and evacuation, evacuation, vacuum purge by product, vacuum purge by gas obtained in a cocurrent depressurization step, simultaneous pressure equalization and product repressurization, and simultaneous feed and product repressurization. Gas for product repressurization and product purge is obtained from the product storage vessel. Gas for pressure equalization is obtained from the bed on simultaneous cocurrent depressurization and evacuation step.

U.S. Pat. No. 4,781,735 describes a three bed $O_2$ VSA process with steps: adsorption, feed to feed or dual end pressure equalization, cocurrent depressurization, evacuation, vacuum purge by gas obtained in cocurrent depressurization step, product repressurization from bed on feed step, simultaneous feed repressurization and feed to feed or dual end pressure equalization.

European patent application 0 354 259 outlines various options for a two bed $O_2$ VSA process: adsorption, cocurrent depressurization, evacuation, pressure equalization with gas obtained in cocurrent depressurization step and feed repressurization. An option includes vacuum purge by product gas from the bed on adsorption step.

U.S. Pat. No. 5,015,271 describes an $O_2$ VSA process with the steps: adsorption, simultaneous cocurrent depressurization and countercurrent evacuation or feed, countercurrent evacuation, simultaneous product to product pressure equalization and feed repressurization, or vacuum purge, simultaneous feed and product repressurization and feed repressurization.

U.S. Pat. No. 5,122,164 describes an $O_2$ VSA process with the steps: adsorption, simultaneous cocurrent depressurization and countercurrent evacuation, countercurrent evacuation, vacuum purge, pressure equalization with gas from a bed undergoing cocurrent depressurization and product repressurization.

U.S. Pat. No. 5,223,004 describes an $O_2$ VSA process with the steps: adsorption, simultaneous cocurrent depressurization and countercurrent evacuation, countercurrent evacuation, purge, repressurization with product and cocurrent depressurization gas from another bed and repressurization with product and feed.

Despite the prior art, a need still exists for an $O_2$ VSA process with higher oxygen recovery (i.e. lower energy costs) and lower adsorbent requirement per unit of oxygen production (i.e. lower capital costs) than the current processes. The present invention outlines a vacuum swing adsorption (VSA) process to produce oxygen from air at higher oxygen recovery and lower adsorbent requirement per unit of oxygen product than current $O_2$ VSA processes.

BRIEF SUMMARY OF THE INVENTION

The present invention is a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at elevated pressure containing the more strongly adsorbable component and the less strongly adsorbable component into an inlet of a first adsorption bed containing the adsorbent selective for the more strongly adsorbable component and adsorbing the more strongly adsorbable component on the adsorbent while the less strongly adsorbable component passes through the first bed unadsorbed as a product and as a source of purge gas for a bed of said plurality of adsorption beds undergoing purge of step (d) and continuing until the adsorption front of the more strongly adsorbable component approaches an outlet of the first bed and terminating the introduction of the feed gas mixture;

(b) following the termination of the introduction of the feed gas mixture into the first bed, cocurrently depressurizing the first bed to a lower pressure to remove a cocurrent depressurization gas from the first bed and passing the cocurrent depressurization gas to an outlet of a bed of the plurality of adsorption beds at lower pressure undergoing repressurizing of step (e) to at least partially pressure equalize the two beds, while countercurrently depressurizing the first bed by connection with a source of vacuum;

(c) countercurrently evacuating the first bed under vacuum conditions to remove the more strongly adsorbable component;

(d) countercurrently purging the first bed with a portion of the less strongly adsorbable component from a bed of the plurality of adsorption beds undergoing step (a) to remove additional more strongly adsorbable component from the first bed;

(e) repressurizing the first bed with ambient and elevated pressure feed gas mixture and the cocurrent depressurization gas from a bed of the plurality of adsorption beds undergoing the cocurrent depressurization of step (b);

(f) further repressurizing the first bed with elevated pressure feed gas mixture; and (g) performing steps (a) through (f) in each of the plurality of adsorption beds in a phased sequence.

Preferably, the first bed is repressurized in step (f) with ambient pressure feed gas mixture and elevated pressure feed gas mixture.

Preferably, the first bed is repressurized in step (f) initially with feed gas mixture and then with less strongly adsorbable component.

Alternatively, the bed is repressurized in step (f) initially with less strongly adsorbable component and then with feed gas mixture.

Further alternatively, the bed is repressurized with less strongly adsorbable component and feed gas mixture simultaneously.

Preferably, the feed gas mixture is air, the more strongly adsorbable component is nitrogen and the less strongly adsorbable component is oxygen.

Further alternatively, the process is carried out in two beds.

Preferably, the pressure equalization of step (b) is performed to complete equalization of the pressures in the two beds engaged in the pressure equalizing of step (b).

The present invention is further a process for selectively separating nitrogen from oxygen in air in two adsorption beds containing an adsorbent selective for nitrogen, comprising the steps of:

(a) introducing feed air at elevated pressure into an inlet of a first adsorption bed containing an adsorbent selective for nitrogen and adsorbing nitrogen on the adsorbent while oxygen passes through the first bed unadsorbed as a product and as a source of purge gas for a second bed undergoing the purge of step (d), until the adsorption front of nitrogen approaches an outlet of the first bed and terminating the introduction of air into the first bed;

(b) following the termination of the introduction of air into the first bed, cocurrently depressurizing the first bed to remove a cocurrent depressurization gas from the first bed and passing the cocurrent depressurization gas to an outlet of the second bed at lower pressure undergoing repressurizing of step (e) to at least partially pressure equalize the first bed and the second bed, while countercurrently depressurizing the first bed by connection to a source of vacuum;

(c) countercurrently evacuating the first bed under vacuum conditions to remove nitrogen from the first bed;

(d) countercurrently purging the first bed with oxygen from the second bed undergoing step (a) to remove additional nitrogen from the first bed;

(e) repressurizing the first-bed with ambient air, elevated pressure feed air and cocurrent depressurization gas from the second bed at higher pressure undergoing the cocurrent depressurization of step (b);

(f) further repressurizing the first bed with elevated pressure feed air; and (g) performing steps (a) through (f) in each of the two adsorption beds in a phased sequence.

Preferably, the first bed is repressurized in step (f) with ambient pressure air and elevated pressure feed air.

Preferably, the feed air is at a pressure in the range of approximately 15–30 psia.

More preferably, the feed air is at a pressure in the range of approximately 15–24 psia.

BRIEF DESCRIPTION OF THE DRAWING

The drawing is a schematic drawing of a preferred embodiment of the present invention using two parallel adsorption beds and appropriate valve manifolding for feed, evacuation, purge, equalization and repressurization.

DETAILED DESCRIPTION OF THE INVENTION

The present invention will now be described with regard to a preferred embodiment.

The preferred embodiment has the following steps:
1. Adsorption (A) to provide product and purge gas,
2. Cocurrent depressurization (DP) to provide pressure equalization gas and simultaneous initiation of countercurrent evacuation,
3. Countercurrent evacuation (DES),
4. Countercurrent purge (PU) with product from (A),
5. Pressure equalization (PE) with cocurrent depressurization gas from (DP) and repressurization with ambient pressure feed gas and elevated pressure feed gas.
6. Feed repressurization (RP) with elevated pressure feed gas, or combinations with ambient pressure feed gas.

A process cycle chart for this option is outlined in Table 1.

TABLE 1

Two Bed O₂ VSA

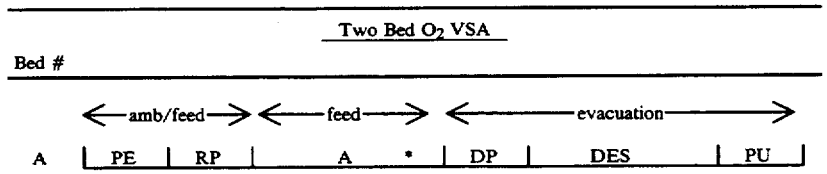

TABLE 1-continued

| B | DP | DES | PU | PE | RP | A | * |

←———evacuation———→ ←amb/feed→ ←——feed——→

A - Adsorption to produce product (Feed gas mixture)
* - Adsorption produces product and purge gas
DP - Cocurrent Depressurization to provide Pressure Equalization gas and simultaneously
Countercurrent Evacuation
DES - Countercurrent Evacuation
PU - Countercurrent Vacuum Purge with Product
PE - Pressure Equalization with Cocurrent Depressurization gas and repressurization
with Ambient Gas and Elevated Pressure Feed Gas Mixture
RP - Repressurization with Elevated Pressure Feed Gas Mixture, optionally with Ambient Air
Amb/feed - Ambient feed gas mixture and Elevated Feed Gas Mixture
Feed - Elevated Feed Gas Mixture and potentially Ambient feed gas mixture if the
pressure in the bed is appropriate Process steps for the preferred embodiment will now be described in detail:

Adsorption Step (A), which comprises:
a. Flowing the elevated feed gas mixture, exemplified by atmospheric air at a pressure of 15-30 psia and temperature of ~0°-150° F. through a bed packed with one or more adsorbents capable of selectively adsorbing water, carbon dioxide, and nitrogen from air.
b. Withdrawing an effluent stream consisting of $O_2$ product at feed pressure. Part of this stream is used as purge gas for bed on step 4 and the remainder constitutes oxygen product.
c. Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.

2. Cocurrent Depressurization Step (DP), which comprises:
a. Discontinuing the feed flow through the spent bed and transferring the feed to another VSA bed.
b. Reducing the pressure in the spent VSA bed from the adsorption pressure level to some "intermediate" level (7.7-25 psia) by connecting the product end of this bed with the product end of the VSA bed on step 5 of its cycle while simultaneously initiating countercurrent evacuation of the spend VSA bed.
c. Discontinuing the above step when the pressure in the spent VSA bed has reached the predetermined intermediate pressure level.

3. Countercurrent Evacuation Step (DES), which comprises:
a. Further reducing the pressure in the spent bed from lower level to the "lowest" level (1.0-10.0 psia) by connecting the feed end of the spent VSA bed with a source of vacuum, such as a vacuum pump.
b. Continuing the above step until the pressure in the VSA bed has reached the predetermined lowest pressure level.

4. Countercurrent Purge Step (PU), which consists of:
a. Continuing evacuation of the VSA bed from the feed end.
b. Connecting the product end of this bed with another VSA bed on step 1 of its cycle. Alternately, purge gas could be obtained from a product surge tank, if such tank is used.
c. Continuing the above steps until pressure in this bed has reached a "low" level (1-12 psia).

5. Pressure Equalization Step (PE), which consists of:
a. Discontinuing evacuation of the above bed and start evacuating another VSA bed. This bed is now called "regenerated" since its capacity for more strongly adsorbed components, such as $N_2$, $H_2O$, and $CO_2$ removal from air, has been restored.
b. Connecting the product end of the regenerated bed with the product end of the bed on step 2 of its cycle and connecting the feed end of the bed with ambient pressure feed gas mixture and elevated pressure feed gas mixture.
c. Continuing the above step for a predetermined time or until pressure in the regenerated bed has reached the predetermined lower level. At the end of PE, step 5, the two beds are much closer in pressure; such that the pressure difference between the two beds is generally less than 2 psia, and preferably less than 1 psia.

6. Repressurization Step, which consists of:
a. Discontinuing the pressure equalization of regenerated bed.
   A. Repressurization (RP), which consists of:
   i) Connecting the feed end of the pressure equalized regenerated bed with the elevated pressure feed gas mixture and potentially with ambient pressure feed gas mixture.
   ii) Continuing the above step until pressure in the regenerated bed is close to or equal to the predetermined adsorption pressure.

OR

B. Simultaneous Product and Feed Repressurization Step (PRP/FRP), which consists of:
   i) Connecting the product end of the regenerated bed with the product reservoir and opening the feed end of the regenerated bed to the feed blower and potentially to ambient pressure feed gas mixture.
   ii) Continuing the above step until the pressure in the regenerated bed is equal to the predetermined adsorption pressure.

OR

C. Sequential Product and Feed Repressurization Step (PRP/FRP), which consists of:
   i) Connecting the product end of the regenerated bed with a product reservoir.
   ii) Discontinuing the product repressurization and opening the feed end of the regenerated bed to the feed blower and potentially to ambient pressure feed gas mixture.

iii) Continuing the above step until the pressure in the regenerated bed is equal to the predetermined adsorption pressure.

OR

D. Sequential Feed and Product Repressurization, which consists of:
  i) Connecting the feed end of the regenerated pressure equalized bed to the feed blower and potentially to ambient pressure feed gas mixture.
  ii) Continuing the above feed repressurization step until pressure in the regenerated bed has reached the predetermined pressure level, which is lower than the adsorption pressure.
  iii) Discontinuing the feed repressurization step and connecting the product end of the regenerated bed with a product reservoir.
  iv) Continuing the above step until the pressure in the regenerated bed is equal to the predetermined adsorption pressure.

The bed is now ready to undergo a new cycle starting from step 1(a).

Flow schematic and hardware will be somewhat different for each of the process options of the present invention. The drawing depicts a schematic for the first preferred embodiment with feed and ambient air repressurization. Table 2 outlines the corresponding valve sequence for a typical cycle time. Detailed process description of the cycle at typical operating conditions for the process option described in the drawing and Tables 1 and 2 is given below: Ambient air compressed to feed pressure (21 psia) by a feed blower 111 comprises the elevated feed gas mixture and enters through manifold 100 and open valve 1 into first Bed A, which has already been pressurized to adsorption pressure. The Bed is packed with adsorbent(s) selective for the removal of water, carbon dioxide, and nitrogen from air. Oxygen product is withdrawn via open valve 8 and manifold 104 to product reservoir 109. During the latter period of oxygen production in Bed A part of the product oxygen is removed through manifold 106 and open valve 6 as purge gas for Bed B. Feed flow is discontinued after a predetermined time or as soon as nitrogen concentration in the effluent from Bed A reaches a preset limit or the adsorption front approaches the bed outlet. Pressure in Bed A is reduced by closing valve 8 and opening valve 7 and connecting Bed A with Bed B via manifold 107. Bed A is simultaneously evacuated via open valve 2 and manifold 102 by a source of vacuum, such as vacuum pump 110. Valve 7 is closed and valve 2 remains opened until Bed A reaches an evacuation level pressure ~4 psia in Bed A. Valve 2 is kept open for a predetermined time while valve 6 is opened to vacuum purge Bed A through manifold 106 with product oxygen from Bed B. Valves 2 and 6 are then closed and valves 1, 5 and 7 are opened for simultaneous ambient feed gas mixture (air), elevated pressure feed air and Bed B cocurrent depressurization gas repressurization through manifolds 103, 100 and 107, respectively. Valve 5 is kept open until pressure in Bed A reaches ambient pressure. At this time, valve 5 is closed and bed A is now pressurized up to adsorption pressure ~21 psia with elevated pressure feed air from manifold 100. Valve 8 is opened to remove product oxygen through manifold 104. Bed A is now ready to start a new cycle.

Both beds go through a similar sequence of operation but out of phase with one another. The feed blower 111 and the vacuum pump 110 run continuously, allowing simplification of operation and downsizing of that equipment.

TABLE 2

| Valve # → Time (sec) | 1 | 2 | 3 | 4 | 5 | 6 | 7 | 8 | 9 |
|---|---|---|---|---|---|---|---|---|---|
| 0–5 | o | | | o | o | o | | | |
| 5–15 | o | | | o | o | | | | |
| 15–35 | o | | | o | | | | o | |
| 35–40 | o | | | o | o | | o | | |
| 40–45 | | o | o | | o | o | | | |
| 45–55 | | o | o | | o | | | | |
| 55–75 | | o | o | | | | | | o |
| 75–80 | | o | o | | | o | | | o | o = open, otherwise closed

Any adsorbent(s) which can selectively separate more strongly adsorbed components from less strongly adsorbed components of a particular feed gas mixture can be used, and the evaluation of such adsorbents for a particular feed gas mixture is well within the capability of those skilled in the art. In the preferred embodiment, an adsorbent that selectively removes water, carbon dioxide, and nitrogen from air can be used. Examples of adsorbents capable of removing nitrogen from air include zeolitic molecular sieves such as NaX, NaA, CaX, CaA and other adsorbents with binary cations. Examples of adsorbents capable of removing water and carbon dioxide from air are aluminas, silica gels and zeolites. Other desired properties of the adsorbents are (i) high crush strength, (ii) high attrition resistance, (iii) large bulk density, (iv) low interpartical void, (v) high heat capacity, (vi) large thermal conductivity, (vii) high $N_2/O_2$ selectivity, (viii) low oxygen capacity and (ix) small particle size. Pressure drop through the adsorbent beds during adsorption and evacuation steps is also important for adsorbent selection.

The benefit of the Present Invention over an oxygen VSA process that does not have the features of the Present Invention, such as cocurrent feed during pressure equalization and product purge, can be seen in the comparison of the Present Invention and U.S. application Ser. No. 08/037,070 filed Mar. 25, 1993, now U.S. Pat. No. 5,328,508, which were both run in a pilot development unit with the following parameters set for each process.

| Process Conditions | | |
|---|---|---|
| Product Purity | = | 90% $O_2$ |
| Feed Pressure | = | 20.4 psia |
| Evacuation Pressure | = | 4.9 psia |
| Feed Temperature | -- | Ambient |
| Adsorbents | -- | NaX at the feed end followed by CaX zeolite |
| Length | = | 7 ft. |
| Diameter | = | 3 ft. |
| Cycle Time | = | 88 sec. |

The results of this comparative test is set forth in Table 3 below which shows a lower adsorbent requirement and lower feed blower size, resulting in a lower cost for oxygen in the Present Invention despite the lower oxygen recovery.

TABLE 3

| | Appln. S.N. 08/037,070 | Present Invention |
|---|---|---|
| $O_2$ Recovery (%) | 52 | 48 |
| lb CaX/TPDC* | 1 | 0.88 |
| Feed Blower ACFM**/TPDC | 1 | 0.80 |
| Vacuum Blower ACFM/TPDC | 1 | 1.02 |
| Power Consumption | | |
| Feed Blower | 1 | 1.04 |
| Vacuum Pump | 1 | 0.98 |
| Total | 1 | 1.0 |
| Oxygen Cost | 1 | 0.97 |

*TPDC = tons per day of contained oxygen
**ACFM = actual cubic feet per minute

The present invention achieves this desirable lower cost of producing product, such as oxygen, in an adsorptive separation by operating the rotating machinery, the feed blower and the vacuum pump, continuously, and preferably in a two bed process. U.S. application Ser. No. 08/037,070 filed Mar. 25, 1993, now U.S. Pat. No. 5,328,803, in its two bed mode, idles the feed blower during the receive pressure equalization and provide purge steps. This results in a larger size feed blower for the above process. The present invention avoids this by feeding air to the bed during both of these steps and results in an unexpected improvement in overall performance of the process. By allowing ambient feed, such as air, to be fed to the bed during the receive pressure equalization step, a greater amount of ambient feed (air) can be utilized by the present invention. This results in additional downsizing of the feed blower and in additional reductions in product costs.

The present invention has been set forth with regard to several illustrative preferred embodiments, but the full scope of the present invention should be ascertained from the claims below.

We claim:

1. A process for selectively separating a more strongly adsorbable component from a less strongly adsorbable component of a feed gas mixture in a plurality of adsorption beds containing an adsorbent selective for the more strongly adsorbable component, comprising the steps (a) introducing a feed gas mixture at elevated pressure containing said more strongly adsorbable component and said less strongly adsorbable component into an inlet of a first adsorption bed containing said adsorbent selective for the more strongly adsorbable component and adsorbing the more strongly adsorbable component on the adsorbent while the less strongly adsorbable component passes through said first bed unadsorbed as a product and as a source of purge gas for a bed of said plurality of adsorption beds undergoing purge of step (d) and continuing until the adsorption front of said more strongly adsorbable component approaches an outlet of said first bed and terminating the introduction of said feed gas mixture;

(b) following the termination of the introduction of said feed gas mixture into said first bed, cocurrently depressurizing said first bed to a lower pressure to remove a cocurrent depressurization gas from said first bed and passing said cocurrent depressurization gas to an outlet of a bed of said plurality of adsorption beds at lower pressure undergoing repressurizing of step (e) to at least partially pressure equalize the two beds, while countercurrently depressurizing said first bed by connection to a source of vacuum;

(c) countercurrently evacuating said first bed under vacuum conditions to remove said more strongly adsorbable component;

(d) countercurrently purging said first bed with a portion of the less strongly adsorbable component from a bed of said plurality of adsorption beds undergoing step (a) to remove additional more strongly adsorbable component from said first bed;

(e) repressurizing said first bed with ambient pressure feed gas mixture, elevated pressure feed gas mixture and said cocurrent depressurization gas from a bed of said plurality of adsorption beds undergoing the cocurrent depressurization of step (b);

(f) further repressurizing said first bed with elevated pressure feed gas mixture; and (g) performing steps (a) through (f) in each of said plurality of adsorption beds in a phased sequence.

2. The process of claim 1 wherein said bed is repressurized in step (f) with ambient pressure feed gas mixture and elevated pressure feed gas mixture.

3. The process of claim 1 wherein said bed is repressurized in step (f) initially with feed gas mixture and then with less strongly adsorbable component.

4. The process of claim 1 wherein said bed is repressurized in step (f) initially with less strongly adsorbable component and then with feed gas mixture.

5. The process of claim 1 wherein said bed is repressurized in step (f) with less strongly adsorbable component and feed gas mixture simultaneously.

6. The process of claim 1 wherein said feed gas mixture is air, said more strongly adsorbable component is nitrogen and said less strongly adsorbable component is oxygen.

7. The process of claim 1 wherein the process is carried out in two beds.

8. The process of claim 1 wherein the pressure equalization of step (b) is a complete pressure equalization.

9. A process for selectively separating nitrogen from oxygen in air in two adsorption beds containing an adsorbent selective for nitrogen, comprising the steps of:

(a) introducing feed air at elevated pressure into an inlet of a first adsorption bed containing said adsorbent selective for nitrogen and adsorbing nitrogen on the adsorbent while oxygen passes through said first bed unadsorbed as a product and as a source of purge gas for a second bed undergoing the purge of step (d), until the adsorption front of nitrogen approaches an outlet of said first bed and terminating the introduction of air into said first bed;

(b) following the termination of the introduction of air into said first bed, cocurrently depressurizing said first bed to remove a cocurrent depressurization gas from said first bed and passing said cocurrent depressurization gas to an outlet of said second bed at lower pressure undergoing repressurizing of step (e) to at least partially pressure equalize said first bed and said second bed, while countercurrently depressurizing said first bed by connection to a source of vacuum;

(c) countercurrently evacuating said first bed under vacuum conditions to remove nitrogen;

(d) countercurrently purging said first bed with oxygen from said second bed undergoing step (a) to remove additional nitrogen from said first bed;

(e) repressurizing said first bed with ambient pressure air, elevated pressure feed air and cocurrent depressurization gas from said second bed at higher pressure undergoing the cocurrent depressurization of step (f) further repressurizing said first bed with elevated pressure feed air; and (g) performing steps (a) through (f) in each of said two adsorption beds in a phased sequence.

10. The process of claim 9 wherein said bed is repressurized in step (f) with ambient pressure air and elevated pressure feed air.

11. The process of claim 9 wherein said first bed is repressurized in step (f) initially with elevated pressure feed air and then with oxygen.

12. The process of claim 9 wherein said first bed is repressurized in step (f) initially with oxygen and then with elevated pressure feed air.

13. The process of claim 9 wherein said bed is repressurized in step (f) with oxygen and elevated pressure feed air simultaneously.

14. The process of claim 9 wherein said elevated pressure feed air is at a pressure in the range of approximately 15–30 psia.

15. The process of claim 9 wherein said elevated pressure feed air is at a pressure in the range-of approximately 15–24 psia.

16. The process of claim 9 wherein at the end of said countercurrently evacuating of step (c) said first bed is at a pressure in the range of approximately 1–10 psia.

17. The process of claim 9 wherein the pressure equalization of step (b) is a complete pressure equalization.

* * * * *

UNITED STATES PATENT AND TRADEMARK OFFICE
CERTIFICATE OF CORRECTION

PATENT NO. : 5,429,666
DATED : July 4, 1995
INVENTOR(S) : Agrawal, et al.

It is certified that error appears in the above-indentified patent and that said Letters Patent is hereby corrected as shown below:

Column 10, lines 35 and 36, delete "i" after 'component' and delete "s" before 'oxygen' and insert -- is --.

Column 11, line 6, after 'step', insert -- (b); --.

Signed and Sealed this

Nineteenth Day of September, 1995

BRUCE LEHMAN

*Attest:*

*Attesting Officer*    *Commissioner of Patents and Trademarks*